US012017969B2

(12) United States Patent
McKnight et al.

(10) Patent No.: US 12,017,969 B2
(45) Date of Patent: *Jun. 25, 2024

(54) COMPOSITIONS AND METHODS COMPRISING NITRIFICATION INHIBITORS CONTAINING A MIXTURE OF PROTIC AND APROTIC SOLVENT SYSTEMS

(71) Applicant: SOILGENIC TECHNOLOGIES, LLC, High Point, NC (US)

(72) Inventors: Gary David McKnight, High Point, NC (US); Randall Linwood Rayborn, Burlington, NC (US); Wei Xu, Sugarland, TX (US); Raymond Patrick Perkins, Tierra Verde, FL (US); Zehui Yang, Ningbo (CN); David Parker, Canyon, TX (US); Andrew Semple, Tampa, FL (US)

(73) Assignee: SOILGENIC TECHNOLOGIES, LLC, High Point, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,133

(22) Filed: Aug. 27, 2022

(65) Prior Publication Data

US 2022/0411346 A1   Dec. 29, 2022

Related U.S. Application Data

(63) Continuation of application No. 17/705,828, filed on Mar. 28, 2022, which is a continuation of application
(Continued)

(51) Int. Cl.
*C05G 3/90* (2020.01)
*C05C 9/00* (2006.01)
(Continued)

(52) U.S. Cl.
CPC ............... *C05G 3/90* (2020.02); *C05C 9/00* (2013.01); *C09K 15/18* (2013.01); *C09K 15/22* (2013.01);
(Continued)

(58) Field of Classification Search
None
See application file for complete search history.

(56) References Cited

U.S. PATENT DOCUMENTS

| 9,650,306 B2 * | 5/2017 | McKnight | C09K 15/18 |
| 2014/0174140 A1 * | 6/2014 | Ortiz-Suarez | C05C 11/00 71/27 |

* cited by examiner

*Primary Examiner* — Wayne A Langel
(74) *Attorney, Agent, or Firm* — Shumaker, Loop & Kendrick, LLP

(57) ABSTRACT

The present invention relates to increasing longevity of the nitrogen content of soil through improved liquid delivery formulations of nitrification inhibitors. The liquid formulation can also be comprised of nitrification inhibitors and optionally urease inhibitors that are blended solutions of each. The nitrification inhibitors are present in a mixture that comprises both a protic and an aprotic solvent system. The novel formulations are designed to be applied to fertilizers, especially urea and manure based fertilizers. The delivery formulations provide an environmentally sound and inherently safe solvating system that improves the storage stability of the urease inhibitors by utilizing liquid organic non-water containing solvents, maintains the nitrification inhibitors in solution to storage temperatures of at least 10° C., and provides improved application to fertilizer of nitrification inhibitors. These delivery formulations enable safe storage, transport and subsequent application or blending with urea-based or manure-based fertilizers that can be
(Continued)

applied to soil in either a liquid or granular form to provide improved nitrogen retention in the soil for uptake for plant life.

17 Claims, 1 Drawing Sheet

Related U.S. Application Data

No. 16/774,790, filed on Jan. 28, 2020, now Pat. No. 11,312,667, which is a continuation of application No. 15/591,741, filed on May 10, 2017, now Pat. No. 10,633,300, which is a continuation of application No. 14/689,470, filed on Apr. 17, 2015, now Pat. No. 9,650,306.

(60) Provisional application No. 61/980,675, filed on Apr. 17, 2014.

(51) Int. Cl.
 *C09K 15/18* (2006.01)
 *C09K 15/22* (2006.01)
 *C09K 15/28* (2006.01)
 *C09K 15/30* (2006.01)

(52) U.S. Cl.
 CPC .............. *C09K 15/28* (2013.01); *C09K 15/30* (2013.01); *Y02P 60/21* (2015.11)

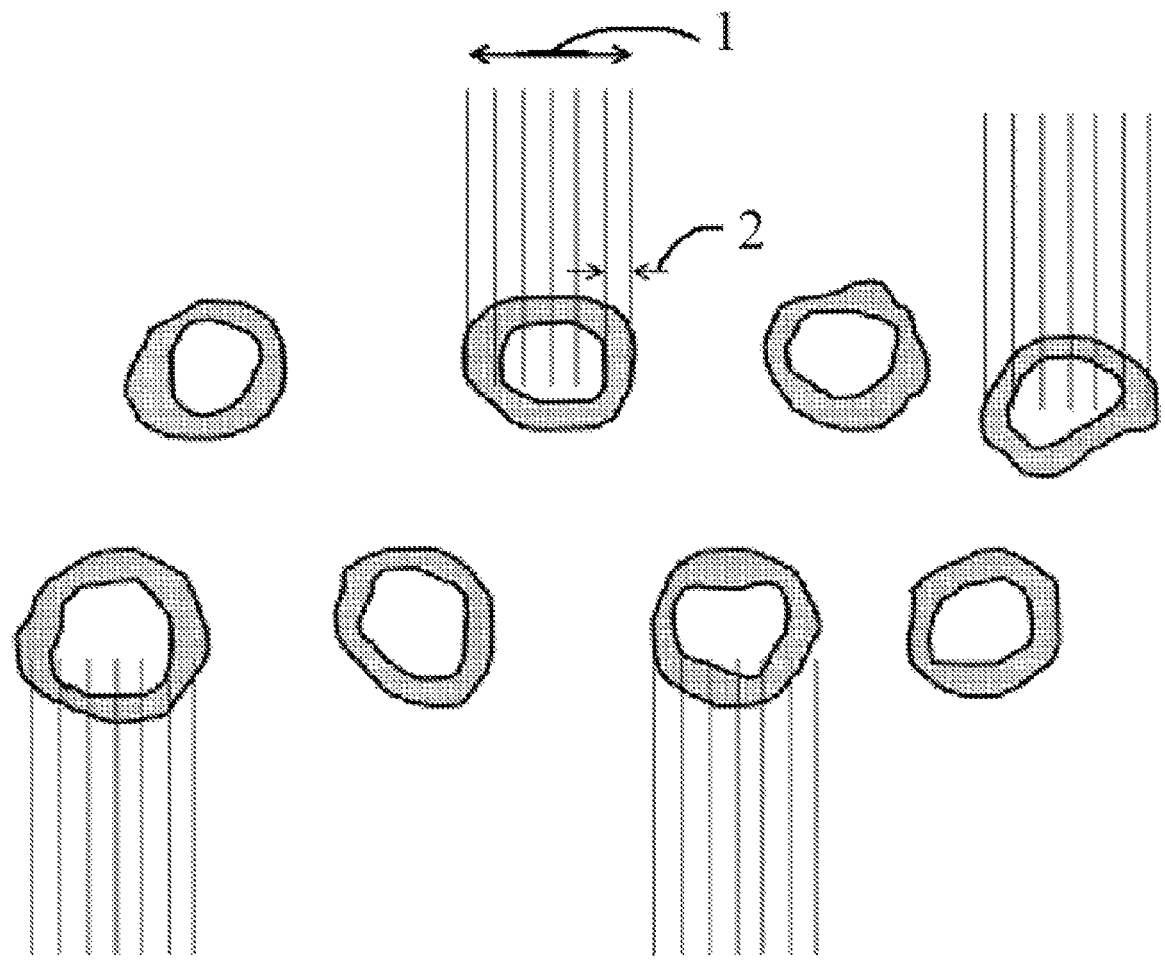

COMPOSITIONS AND METHODS COMPRISING NITRIFICATION INHIBITORS CONTAINING A MIXTURE OF PROTIC AND APROTIC SOLVENT SYSTEMS

The present invention is a continuation and claims priority under 35 USC 120 to U.S. application Ser. No. 17/705,828, filed Mar. 28, 2022, which in turn claims priority to U.S. application Ser. No. 16/774,790 filed Jan. 28, 2020, which in turn claims priority and is a continuation of U.S. application Ser. No. 15/591,741 filed May 10, 2017, which in turn claims priority to and is a continuation of U.S. application Ser. No. 14/689,470 filed Apr. 17, 2015, which in turn claims priority under 119(e) to U.S. Provisional Application No. 61/980,675, filed Apr. 17, 2014, the entire contents of all of which are incorporated by reference in their entireties.

FIELD OF INVENTION

The present invention relates to increasing and/or maintaining nitrogen content in soil by administration of an improved liquid formulation. In one embodiment, the liquid formulation comprises nitrification inhibitors. In, the liquid formulations are designed to be used in conjunction with urea and/or manure based fertilizers.

BACKGROUND OF THE INVENTION

Agriculture currently utilizes fertilizers to deliver the needed nutrients of nitrogen, phosphorus, potassium, sulfur, calcium, and magnesium to plants through the application of fertilizers to the soil. Nitrogen generally is the most yield-limiting and costly nutrient element in crop production. Fertilizers are based on nitrogen content, mainly urea and additional plant nutrients and additives. Fertilizers can either be formulated as man-made products or natural organic based animal manure. Nitrogen is the primary nutrient in fertilizers and urea is the primary nitrogen source in fertilizers. Thus, fertilizers have become one vehicle for increasing the nitrogen content in the soil to assist in maintaining the health, overall quality, growth and yields of many of the plants important to agriculture and to civilization. Nitrogen is usually formulated into fertilizer by one or more of urea and/or ammonium nitrate and/or ammonium sulfate and/or manure and/or ammonium phosphate and/or the like.

Generally, the fertilizer is applied to the soil as either a liquid or a solid. Maintaining a sufficient level of nitrogen concentration in the soil proves difficult over time due to nitrogen and nitrogen containing compounds (such as urea) solubilities in water.

When rain or water run-off contacts the soil, the nitrogen or nitrogen containing compounds may be carried with the water to surrounding water-ways.

Alternatively, the degradation of nitrogen content may be attributed to volatilization (such as for ammonia and NOx where x is 1, 2 or 3) and water runoff due to the better water solubility of nitrites/nitrates. Loss due to volatilization is sometimes driven by a urease enzyme that catalyzes hydrolysis of urea to ammonia and carbon dioxide and to the biological oxidation by soil microbes, such as Nitrosomonas bacteria, of NH3 or NH4 to NOx's such as nitric oxide, an atmospheric greenhouse gas which, on a molecular basis, has 310 times the global warming potential of carbon dioxide. This results in a substantial loss of nitrogen content in the fertilizer impacting costs to the farmer. Moreover, the loss of nitrogen from the soil results not only in water pollution but also atmospheric pollution.

Nitrogen in the soil is also lost by the attack of nitrogen and nitrogen containing compounds (such as urea) by enzymes like the urease enzyme. Attack by the urease enzyme causes urea to degrade to carbon dioxide and ammonia. Biological oxidations by soil microbes, such as Nitrosomonas bacteria, of ammoniacal nitrogen to nitrate nitrogen are also a cause of the diminishing nitrogen content in soil over time. While the conversion of urea to ammonia and oxidation of ammonia to nitrates within the soil is beneficial to plants, conversions occurring on top of the soil, where fertilizers are applied, also results in a loss of nitrogen. To improve the longevity of nitrogen in the soil, fertilizers have been treated with nitrification inhibitors and urease inhibitors. These inhibitors are usually imparted onto the surface of fertilizer granules or added to liquid fertilizers through an aqueous solution.

Thus, it is desired that one increase the life expectancy of nitrogen in the soil to insure more consistent levels of nitrogen during the growing season while also decreasing the number of times the fertilizer is applied to the soil. Increasing the life expectancy of nitrogen in soil while simultaneously decreasing the number of applications of fertilizer will lower the overall cost to the agriculture industry while at the same time limiting the amount of nitrogen carried into the waterways. The present methods that are used create polluting conditions that are believed to have fueled the formation of the Gulf Dead Zone, the formation of toxic algal blooms as well as damage to drinking water supplies. Thus, finding delivery formulations that are safe for the environment and for animals and that contain the proper levels of nitrification inhibitors and/or urease inhibitors that may be applied directly to the soil in a liquid form or imparted onto fertilizer granules as a one-step application would be advantageous to the agricultural industry. Such a treated fertilizer would also assist in slowing two major biological processes that cause substantial loss of nitrogen in soil while simultaneously assisting in controlling pollution of our water and atmosphere.

Various methods as disclosed in the patents below, which are incorporated by reference in their entireties. These methods have been proposed and developed for controlling volatile nitrogen losses from urea.

Barth (U.S. Pat. No. 6,488,734) introduces the concept of the use of polyacids, which contain nitrification inhibitors, and pyrazole derivatives for the treatment of inorganic fertilizers;

Halpern (U.S. Pat. No. 5,106,984) shows how to prepare 1,1-dichloro-2-propanone and acrylonitrile by the formation and further reaction of 4,4-dichloro-5-oxo-hexanenitrile, which are utilized as herbicides and as a nitrification inhibitor.

Evrard (U.S. Pat. No. 4,294,604) discloses the use of selected N-(2,6-dimethylphenyl)-alanine methyl ester compounds as ammonium nitrification inhibitors.

Michaud (U.S. Pat. No. 4,234,332) describes aqueous solutions of commonly used fertilizers which also contain dicyandiamide, in an amount to provide at least 10% by weight of dicyandiamide nitrogen which is an effective nitrification inhibitor.

Sutton et al. (U.S. Pat. No. 5,024,689) teach the use of liquid fertilizer that includes urease inhibitors such as NBPT and nitrification inhibitor such as dicyandiamide in aqueous mixtures of urea, ammonium polyphosphate, ammonium thiosulfate and potentially other plant growth improving compounds.

Sutton (U.S. Pat. No. 8,562,711) provides a method for developing a dry, flowable additive for aqueous urea-based fertilizers based on solid urea formaldehyde polymer, N-(n-butyl) thiophosphoric triamide, and, optionally, dicyandiamide that imparts reduced nitrogen loss from the soil. Also, Sutton provides that the dry additive may be blended with molten or solid urea to form a solid urea-based fertilizer with reduced nitrogen loss from the soil.

While many of these techniques have a positive impact of maintaining the level of nitrogen in the soil, they also have significant problems. For example, problems that have adversely affected the agricultural industry include costs of improvement, loss of viability upon storage, and the inability to deliver consistent levels of fertilizer due to poor coating of the inhibitors or clumping of granules. Some innovations utilize aqueous delivery systems to granular fertilizer. However, aqueous delivery systems not only cause fertilizer to clump, but if this fertilizer has also been coated with an alkyl thiophosphoric triamide such as nBTP, the presence of moisture will cause degradation of the alkyl thiophosphoric triamide. Other techniques utilize adding DCD powder to other solids, which is costly due to major fertilizer producers' processes for are continuous and not batch operations. Thus, there is a need for a non-aqueous liquid formulation containing a nitrification inhibitor, which addresses many of the shortcomings discussed above providing more flexibility for fertilizer manufactures to produce products designed to the soil requirement in different regions of the world.

BRIEF SUMMARY OF THE INVENTION

Urea is a desirable starting material for fertilizers and fertilizer additives, which can provide high nitrogen content and can be used in fertilizer products that provide phosphorus or potassium as primary nutrients, and calcium, magnesium, or sulfur as secondary nutrients or micronutrients such as boron, copper, iron, manganese, molybdenum and zinc. These fertilizer products can deliver the nutrients to the soil and through numerous biological processes can be converted to forms that are capable of being absorbed by plants.

In embodiments, the present invention relates to improved solvent formulations for the Nitrification inhibitor Dicyandiamide, hereafter referred to by its acronym DCD. DCD is a solid chemical substance, which is dissolved in a suitable solvent to allow application at low levels in the field. Additionally, solutions of DCD are desirable when it is to be incorporated as a component of a granular mixed fertilizer, such that it can be deposited as a coating in a controlled and homogenous layer. In one embodiment, this invention proposes formulations of mixtures containing aprotic and protic solvents which are more environmentally friendly and are safe for workers to handle.

In one embodiment, improved delivery formulations have been developed that deliver expected and effective levels of nitrification inhibitors that increase the nitrogen longevity in the soil. It has been found that the delivery formulations of the present invention provide a liquid vehicle to deliver an even, non-clumping application of the desired inhibitors to the fertilizer granule. These new delivery formulations for nitrification inhibitors are non-water-containing organo-liquids that improve storage life of urease inhibitors such as alkyl thiophosphoric triamides over those formulations containing greater than 1% water. In fact, because of the present invention, one can now combine both nitrification and urease inhibitors in one product by either blending together the dispersions of each or by combining the dispersions of both inhibitors in the same improved solvent formulations.

Thus, in one embodiment, the present invention relates to improved compositions of organo-liquid ingredients in a solvating system that:
  Are environmentally safe;
  Have flashpoints above 145° F.;
  Are inherently rated safe for contact with humans and animals;
  Maintain the nitrification inhibitors at levels of 1-50% in solution to storage temperatures down to at least 10° C.;
  Provides improved even application to fertilizer granules of nitrification inhibitors while not causing clumping of the granules.
  Substantially free of water
  In one embodiment, it has also been discovered that while various organo-liquids might meet some of the above criteria, the delivery system of the present invention can be optimized to provide a formulation with a high concentration of inhibitors while maintaining a low chill point by combining two or more organo-liquids in a solvating system. In one embodiment, one process for preparing the formulations of the present invention is to heat the combined solvents to temperatures approaching about ~80° C. and charging the nitrification inhibitor(s) in a combined level of 10-60% of the total formula composition, which can be dissolved in the solvent mixture with moderate agitation.

In one embodiment, the present invention relates to an effective solvent combination that comprises dimethyl sulfoxide (DMSO), which can be used in combination with another organo-liquid delivery system that has a low chill point and good solvating properties. One advantage of using DMSO is that DMSO can be a source of the important nutrient of sulfur.

BRIEF DESCRIPTION OF THE SEVERAL VIEWS OF THE DRAWING

FIG. 1 shows a schematic drawing representing urea prills associated with the present invention wherein the average diameter size 1 of each prill is 3.2 mm. FIG. 1 shows that the prills have been treated with a composition according to the present invention wherein the average penetration depth 2 of the composition into each prill is approximately 0.5 mm.

DETAILED DESCRIPTION

Improved delivery formulations have been developed that deliver effective levels of nitrification inhibitors that increase the nitrogen longevity in the soil. These delivery formulations not only provide a liquid vehicle to deliver an even, non-clumping application of the desired inhibitors to the fertilizer granule, but it has been discovered that formulations based on non-aqueous solvating systems improve the storage life of the important urease inhibitors, such as alkyl thiophosphoric triamides. Alkyl thiophosphoric triamides, if present in combination with nitrification inhibitors as contained in the present formulations, have been shown to be extremely effective urease inhibitors but suffer from degradation upon storage if exposed to moisture. Thus, in one embodiment the present invention relates to compositions that are substantially free of water.

The delivery system of the present invention is based on improved solvent formulations (s) that is used to solubilize one or more nitrification inhibitors and can contain one or more of the following:

Urease inhibitor(s);
Additives such as but not limited to surfactants, buffers, fragrance/odor masking agents, colorants, micro-nutrients, and/or flow modifiers such as silica.

In one embodiment, the compositions of the present invention contain one or more nitrification inhibitors, and one or more urease inhibitors. These compositions optionally contain one or more of surfactants, buffers, fragrance/odor masking agents, colorants, micro-nutrients, and/or flow modifiers.

In one embodiment, the improved solvent formulations of the present invention meet one or more of the following criteria: They are:
  environmentally safe;
  thermally safe because they have flashpoints above 145° F.;
  inherently rated safe for contact with humans and animals;
  able to maintain nitrification inhibitors at levels of 1-50% in solution to temperatures down to at least 10° C.; This ability means that these compositions have relatively long storage lives;
  able to provide improved and even application to fertilizer granules of nitrification inhibitors while not causing clumping of the granules;
  substantially free of water which also provides improved stability of urease inhibitors, primarily alkyl thiophosphoramides such as N-(n-butyl) thiophosphoric triamide (NBPT).

In some embodiments, the stability of the composition is at least 10% more relative to known solvating systems containing water.

In one embodiment, the present invention relates to liquid formulations containing DCD. In an embodiment, the formulations can be made by dissolving the DCD into an aprotic solvent consisting of a) dimethyl sulfoxide (DMSO), b) dialkyl, diaryl, or alkylaryl sulfoxide having the formula

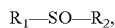

when $R_1$ is methyl, ethyl, n-propyl, phenyl or benzyl and $R_2$ is ethyl, n-propyl, phenyl or benzyl, c) mixed with protic component(s) consisting of 1) an alcohol or polyol from the family of alkylene and poly(alkylene) glycols (PG), 2) an alkylene glycol from the group comprised of ethylene, propylene, or butylene glycol, 3) glycerin, 4) an alkanolamine from the group comprising ethanolamine, diethanolamine, dipropanolamine, methyl diethanolamine, monoisopropanolamine and triethanolamine, 5) alkylene glycol alkyl ethers from the group comprising Tripropylene glycol methyl ether, Tripropylene glycol butyl ether and/or 6) ethyl, propyl, or butyl lactate.

Additionally, the delivery formulations of the present invention may contain one or more of the following:
  a food coloring or dye that may be used to improve the visual evidence of complete coverage and serve as a visual marker;
  scents or masking agents to improve the odor of the formulations;
  Nonionic, anionic, cationic, zwitterionic, and/or amphoteric surfactants to improve formula application performance of fertilizer granules; and
  Buffering agents
  One or more urease inhibitors in an organic liquid dispersing system;

In one embodiment, the formulations of the present invention may use Dicyandiamide at levels from between about 5-50% of the total composition. Using concentrations in this range gives cost effective performance and provides the secondary benefit of being a slow release fertilizer. It is believed that this is due to the relatively high 65% nitrogen content. In one embodiment, the present invention provides for compositions that are substantially free of water. These compositions provide advantages over the systems of the prior art that use water as the delivery solvent. The present invention is also advantageous relative to other systems that have used cost prohibitive coating/adhesion technologies or powder additives to the formation of the fertilizer particle. In one embodiment of the present invention, the utilization of ambient temperature organic solvent systems allows for non-clumping granules. Moreover, use of these ambient temperature organic solvent systems prevents thermal degradation of these compositions. In one embodiment, urease inhibitors such as phosphoric triamides are ideally suited for providing fertilizer systems an additive that are not susceptible to degradation or degradation of the fertilizer system(s) itself. In one embodiment, the present invention allows for the additional benefit that coating or adhesion is not needed to maintain a consistent level of nitrification inhibitor on the fertilizer.

In an embodiment, the formulation(s) of the present invention may contain one or more nitrification inhibitors in combination with one or more urease inhibitors. Urease inhibitors can be but are not limited to phosphoric triamides. While phosphoric triamides are extremely effective, thiophosphoric triamides have longer term impact on soil nitrogen content and also contribute the primary nutrient of sulfur to the soil. The presence of an alkyl group on thiophosphoric triamides, such as n-butyl thiophosphoric triamide, improves further the urease inhibitor's longevity in the soil. In an embodiment, it has been found that effective levels of urease inhibitor in the delivery system are from about 5-50% or from about 10-50% or from about 20-40% of the total concentration of the formulation(s).

In an embodiment, Dicyandiamide (DCD) may be incorporated in amounts that are about 10-45% of a formulation mixture that also contains DMSO and propylene glycol at ratios from about 80/20 to 20/80. In an embodiment, DCD may be added, under agitation, to the combined organic liquids that have been heated in a mixing vessel at a temperature of about 0° C. to 100° C., or alternatively to a temperature of about 40° C. to 100° C., or alternatively to a temperature of about 60° C. to 100° C., or alternatively to a temperature of about 70° C. to 100° C., and mixed until the DCD is completely dissolved. In an embodiment, the heated mix vessel may be jacketed and the temperature carefully controlled. In a variation, the mixing action allows complete mixing without too much aeration. Heating can be accomplished using hot water or low pressure steam to control any hot spots on walls of the vessel to prevent heat degradation to the DCD. Alternatively, the mixing may be done at reduced pressure or the action can be performed in an inert atmosphere (such as but not limited to nitrogen and/or carbon dioxide) to limit thermal or oxidative degradation. At this stage (after the initial mixing), the mixture may be cooled to about 25° C. or below and one or more of the following may be added, if desired:
  One or more urease inhibitors dispersed in an organic liquid dispersing system;
  a food coloring or dye to improve the visual evidence of complete coverage and serve as a visual marker;
  scents or masking agents to improve the odor of the formula;

Nonionic, anionic, cationic, zwitterionic, and/or amphoteric surfactants to improve formula application performance of fertilizer granules; and/or Buffering agents.

In an embodiment, Dicyandiamide (DCD) may be incorporated in an amount that is between about 10-45% of the total formulation amount wherein the formulation also contains a mixture of DMSO and one or more of ethylene and or propylene glycol present at ratios between about 80/20 to 20/80 by volume or by mass. In an embodiment, DCD may be added, under agitation, to the combined organic liquids that have been heated in a mixing vessel at a temperature of about 0° C. to 100° C. or alternatively to a temperature of about 40° C. to 100° C., or alternatively to a temperature of about 60° C. to 100° C., or alternatively to a temperature of about 70° C. to 100° C., and mixed until the DCD is completely dissolved. In an embodiment, the heated mix vessel may be jacketed and the temperature carefully controlled. In a variation, the mixing action allows complete mixing without too much aeration. The heating can be accomplished using hot water or low pressure steam to control any hot spots on walls of the vessel to prevent heat degradation to the DCD. Alternatively, mixing may occur at reduced pressure or the action can be performed in an inert atmosphere (such as but not limited to nitrogen and/or carbon dioxide) to limit thermal or oxidative degradation. One or more of the following may be added, if desired:

one or more urease inhibitors dispersed in an organic liquid dispersing system;

a food coloring or dye that improves the visual evidence of complete coverage and serves as a visual marker;

scents or masking agents that improve the odor of the formula;

nonionic, anionic, cationic, zwitterionic, and/or amphoteric surfactants to improve formula application performance on insuring even distribution and of fertilizer granules in the soil: and/or buffering agents.

In an embodiment, one or more additional urease inhibitors and/or one or more additional nitrification inhibitors may be added to formulations of the present invention. In an embodiment, the additional urease inhibitor and/or nitrification inhibitor may be dissolved in the mixture. In an embodiment, useful mixtures may be prepared either by dilution or mixture with liquid fertilizers.

Examples of the present formulation include liquid mixtures of urea or solid mixtures that may be made by contacting the mixture with solid fertilizers such as granular urea. In an embodiment, coated granular urea can be prepared by using any commercially available equipment in which granular product can be mixed or sprayed with a liquid. A flow aid, silicas or surfactants such as soap or nonionic surfactants may be added prior to addition of the liquid for improved dispersability.

The resulting product(s) can be applied to soil in either a liquid or granular form to provide improved nitrogen retention in the soil for uptake for plant life.

In an embodiment, the one or more nitrification inhibitors comprises dicyanoamides and the one or more urease inhibitors comprises phosphoramides.

In an embodiment, the composition may comprise one or more of surfactants, buffers, fragrance/odor masking agents, colorants, micro-nutrients, and/or flow modifiers.

In an embodiment, the one or more nitrification inhibitors comprises dicyandiamide in a formulation wherein dicyandiamide is present in an amount that is between about 10-45% of a total formulation amount and the formulation also contains a mixture of DMSO and propylene glycol in ratios that are between about 20/80 to 80/20.

In an embodiment, the composition comprises one or more nitrification inhibitors that comprises dicyandiamide in a formulation wherein dicyandiamide is present in an amount that is between about 10-45% of a total formulation amount and the formulation also comprises N-(n-butyl) thiophosphoric triamide.

In an embodiment, the composition is substantially free of water.

In an embodiment, the present invention relates to fertilizer additives. In one embodiment, the fertilizer additive comprises one or more nitrification inhibitors and one or more urease inhibitors.

In an embodiment, the present invention relates to a composition comprising one or more nitrification inhibitors in an organic liquid solvating system comprising at least one of an aprotic solvent and a protic solvent. The composition may contain both a protic solvent and an aprotic solvent. The composition optionally contains DMSO. Typical protic solvents that may be used in conjunction with the compositions of the present invention include various types of glycols. Examples of these glycols include tripropylene glycol methyl ether, dipropylene glycol, and propylene glycol. Typical aprotic solvents include DMSO, propylene carbonate, N,N-dimethyl 9-decenamide, and dimethyl acetamide.

In one variation, the present invention includes a nitrification inhibitor, DMSO and any one or more of the following solvents: tripropylene glycol methyl ether, dipropylene glycol, propylene carbonate, N,N-dimethyl 9-decenamide, and dimethyl acetamide.

In an embodiment, the present invention relates to a composition comprising one or more nitrification inhibitors in an organic liquid solvating system comprising a mixture of aprotic and protic solvents wherein the aprotic solvent is dimethyl sulfoxide, dialkyl sulfoxide, diaryl sulfoxide, or an alkylaryl sulfoxide having the formula

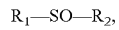

$$R_1\text{—SO—}R_2,$$

wherein $R_1$ is methyl, ethyl, n-propyl, phenyl or benzyl and $R_2$ is ethyl, n-propyl, phenyl or benzyl, and the protic component(s) is/are one or more of 1) an alcohol or polyol from the family of $C_{1-10}$ alkynols and poly($C_{1-10}$ alkylene) glycols, 2) an alkylene glycol selected from the group consisting of ethylene, propylene, and butylene glycol, 3) glycerin, 4) an alkanolamine selected from the group consisting of ethanolamine, diethanolamine, dipropanolamine, methyl diethanolamine, monoisopropanolamine and triethanolamine, 5) alkylene glycol alkyl ethers selected from the group consisting of Tripropylene glycol methyl ether, and Tripropylene glycol butyl ether and/or 6) ethyl, propyl, or butyl lactate.

In one variation, the one or more nitrification inhibitors may comprise dicyandiamide.

In an embodiment, the aprotic component is dimethyl sulfoxide.

In one variation, the composition may comprise dimethyl sulfoxide and the amount of dimethyl sulfoxide in the composition may be between about 90/10 and 10/90 (by volume or by weight) of the composition.

In one embodiment, the one or more nitrification inhibitors may comprise dicyandiamide in a formulation wherein dicyandiamide may be present in an amount that is between about 10-45% of the total formulation amount and the formulation may optionally also contain a mixture of DMSO and propylene glycol in ratios that are between about 20/80 to 80/20.

In an embodiment, the composition may further comprise one or more of surfactants, buffers, fragrance/odor masking agents, colorants, micro-nutrients, dispersed urease inhibitor(s) and/or flow modifiers.

In a variation, the one or more nitrification inhibitors may comprise dicyandiamide in a formulation wherein dicyandiamide is present in an amount that is between about 10-45 of the total formulation amount and the formulation may optionally also contain a mixture of DMSO and propylene glycol in ratios that are between about 20/80 to 80/20.

In one embodiment, the one or more nitrification inhibitors may comprise dicyandiamide in a formulation wherein dicyandiamide is present in an amount that is between about 10-45% of the total formulation amount and the formulation may optionally also comprise N-(n-butyl) thiophosphoric triamide.

In one variation, the composition may be substantially free of water.

In an embodiment, the fertilizer additive has one or more nitrification inhibitors that comprises dicyanoamides and one or more urease inhibitors that comprises phosphoramides.

In an embodiment, the present invention relates to making compositions and fertilizer additives. In one embodiment, the present invention relates to a method of making a composition to be added to a fertilizer, wherein the method comprises:

heating a mixture comprising one or more nitrification inhibitors;

cooling the mixture to a temperature that optionally allows addition of one or more of surfactants, buffers, fragrance/odor masking agents, colorants, micro-nutrients, and/or flow modifiers.

In one variation of the method, the method comprises further adding the composition to a fertilizer.

In one variation, the method comprises a composition that has one or more nitrification inhibitors, the one or more nitrification inhibitors being selected from the group consisting of 2-chloro-6-trichloromethyl pyridine, 4-Amino-1,2,4-6-triazole-HCl, 2,4-Diamino-6-trichloromethyltriazine CL-1580, Dicyandiamide, thiourea, 1-Mercapto-1,2,4-triazole, and 2-Amino-4-chloro-6-methylpyrimidine.

In one embodiment, the method has a composition that comprises one or more nitrification inhibitors containing dicyanoamides and one or more urease inhibitors containing phosphoramides.

In one embodiment, the method has a composition that is substantially free of water. The following Examples are presented to illustrate certain embodiments of the present invention.

Example 1

65 grams of dimethyl sulfoxide was charged to a vessel and then placed under strong agitation and then heated to 60° C. 25 grams of dicyandiamide was then charged to the vessel and mixed until completely dissolved. Once dissolved, the mixture was cooled to 38° C. and 10 grams of tripropylene glycol methyl ether was added. The mixture was cooled to <30° C. and then packaged off in an appropriate container.

Example 2

69 grams of dimethyl sulfoxide was charged to a vessel and then placed under strong agitation and then heated to 60° C. 15 grams of dicyandiamide was then charged to the vessel and mixed until completely dissolved. Once dissolved, the mixture was cooled to 40° C. and then 10 grams of 2-chloro-6-trichloromethylpyridine was as added and mixed until dissolved. 6 gram of tripropylene glycol methyl ether was added and the mixture was cooled to <30 C and then packaged off in an appropriate container.

Example 3

65 grams of dimethyl sulfoxide was charged to a vessel and then placed under strong agitation and then heated to 80° C. 10 grams of dicyandiamide and 10 grams of thiourea were then charged to the vessel and mixed until completely dissolved. Once dissolved, the mixture was cooled to 38° C. and then 5 grams of n-butyl thiophosphoric triamide was charged to the vessel and mixed until completely dissolved. 15 grams of propylene glycol was charged to the vessel and the mixture was agitated for 30 minutes. The mixture was then cooled to <30° C. and then packaged off in an appropriate container.

Example 4

57.1 grams of dimethyl sulfoxide was charged to a vessel and then placed under strong agitation and then heated to 40° C. 20 grams of 2-chloro-6-trichloromethylpyridine was then charged to the vessel and mixed until completely dissolved. Once dissolved, 22.9 grams of dipropylene glycol was charged the mixture was cooled to <30° C. and then packaged off in an appropriate container.

Example 5

58.3 grams of dimethyl sulfoxide was charged to a vessel and then placed under strong agitation and then heated to 60° C. 25 grams of 3,4 dimethylpyrazole phosphate was then charged to the vessel and mixed until completely dissolved. Once dissolved, the mixture was cooled to 38° C. and then 4.3 grams of tripropylene glycol methyl ether and 12.5 grams of propylene carbonate were charged to the vessel and the mixture was agitated for 30 minutes. The mixture was then cooled to <30° C. and then packaged off in an appropriate container.

Example 6

54.4 grams of dimethyl sulfoxide was charged to a vessel and then placed under strong agitation and then heated to 60° C. 10 grams of 2-chloro-6-trichloromethylpyridine and 15 grams of thiourea were then charged to the vessel and mixed until completely dissolved. Once dissolved, the mixture was cooled to 38° C. and then 10.6 grams of dipropylene glycol and 10 grams of propylene glycol were charged to the vessel and the mixture was agitated for 30 minutes. The mixture was then cooled to <30° C. and then packaged off in an appropriate container.

Example 7

45 grams of dimethyl sulfoxide was charged to a vessel and then placed under strong agitation and then heated to 60° C. 25 grams of 1H-1,2,4,-triazole thiol was then charged to the vessel and mixed until completely dissolved. Once dissolved, the mixture was cooled to 38° C. and then 30 grams of N,N-dimethyl 9-decenamide was added to the vessel and the mixture was agitated for 30 minutes. The mixture was then cooled to <30° C. and then packaged off in an appropriate container.

Example 8

50 grams of dimethyl sulfoxide was charged to a vessel and then placed under strong agitation and then heated to 60°

C. 15 grams of 2-chloro-6-trichloromethylpyridine was then charged to the vessel and mixed until completely dissolved. Once dissolved, the mixture was cooled to 38° C. and then 5 grams of n-butylthiophosphoric triamide was and the resulting product was mixed until dissolved. 30 grams of dipropylene glycol was charged to the vessel and the mixture was agitated for 30 minutes. The mixture was then cooled to <30° C. and then packaged off in an appropriate container.

Example 9

80 grams of dimethyl sulfoxide was charged to a vessel and then placed under strong agitation and then heated to 80° C. 20 grams of dicyandiamide was then charged to the vessel and mixed until completely dissolved. Once dissolved, the mixture was cooled to 30° C. and packaged off in an appropriate container.

Example 10

80 grams of dimethyl sulfoxide was charged to a vessel and then placed under strong agitation and then heated to 38° C. 20 grams of n-butylthiophosphoric triamide was then charged to the vessel and mixed until completely dissolved. Once dissolved, the mixture was cooled to 30° C. and packaged off in an appropriate container.

Example 11

80 grams of propylene carbonate was charged to a vessel and then placed under strong agitation and then heated to 38° C. 20 grams of n-butylthiophosphoric triamide was then charged to the vessel and mixed until completely dissolved. Once dissolved, the mixture was cooled to 30 C and packaged off in an appropriate container.

Example 12

80 grams of tripropylene glycol methyl ether was charged to a vessel and then placed under strong agitation and then heated to 38° C. 20 grams of dicyandiamide was then charged to the vessel and mixed until completely dissolved. Once dissolved, the mixture was cooled to 30° C. and packaged off in an appropriate container.

Example 13

75 grams of dimethyl sulfoxide was charged to a vessel and then placed under strong agitation and then heated to 60° C. 25 grams of 4-amino-4H-1,2,4-triazole was then charged to the vessel and mixed until completely dissolved. Once dissolved, the mixture was cooled to 30° C. and packaged off in an appropriate container.

Example 14

50 grams of Example 9 and 50 grams of Example 10 were mixed together for 30 minutes and then packaged off in an appropriate container.

Example 15

58.3 grams of dimethyl sulfoxide was charged to a vessel and then placed under strong agitation and then heated to 60° C. 25 grams of 4-amino-4H-1,2,4-triazole was then charged to the vessel and mixed until completely dissolved. Once dissolved, the mixture was cooled to 30° C., 16.7 grams of propylene glycol was added, the formulation was mixed 30 minutes and then packaged off in an appropriate container.

Example 16

80 grams of dipropylene glycol was charged to a vessel and then placed under strong agitation and heated to 38° C. 20 grams of 2-chloro-6-trichloromethylpyridine was then charged to the vessel and mixed until completely dissolved. The mixture was cooled to 30° C. and packaged off in an appropriate container.

Example 17

50 grams of dimethyl sulfoxide was charged to a vessel and then placed under strong agitation and then heated to 80° C. 20 grams of dicyandiamide was then charged to the vessel and mixed until completely dissolved. Once dissolved, the mixture was cooled to 30° C. and 16 grams of propylene carbonate, and 14 grams of propylene glycol were charged to the vessel and then mixed for 15 minutes and packaged off in an appropriate container.

Example 18

80 grams of propylene glycol was charged to a vessel and then placed under strong agitation and then heated to 60° C. 20 grams of thiourea was then charged to the vessel and mixed until completely dissolved. The mixture was cooled to 30° C. and packaged off in an appropriate container.

Example 19

50 grams of dimethyl acetamide was charged to a vessel and then placed under strong agitation and then heated to 38° C. 20 grams of n-butylthiophosphate triamide was then charged to the vessel and mixed until completely dissolved. Once dissolved, the mixture was cooled to 30° C. and 20 grams of propylene carbonate and 10 grams of propylene glycol were charged to the vessel and mixed for 15 minutes and then packaged off in an appropriate container.

Example 20

75 grams of dimethyl sulfoxide was charged to a vessel and then placed under strong agitation and then heated to 60° C. 25 grams of 3,4 dimethylpyrazole phosphate was then charged to the vessel and mixed until completely dissolved. Once dissolved, the mixture was cooled <30° C. and then packaged off in an appropriate container.

Example 21

75 grams of dimethyl sulfoxide was charged to a vessel and then placed under strong agitation and then heated to 60° C. 25 grams of 2-chloro-6-trichloromethylpyridine was then charged to the vessel and mixed until completely dissolved. Once dissolved, the mixture was cooled <30° C. and then packaged off in an appropriate container.

The below table 1 summarizes the compositions that occur in each of the examples. The presence of an "X" in table 1 means that the particular example composition contains that particular component.

TABLE 1

| Example No. | DMSO | DCD | TPGME | CTMP | thiourea | NBPT | PG | DPG | DMPP | PC | TT | DD | AT | DMA |
|---|---|---|---|---|---|---|---|---|---|---|---|---|---|---|
| 1 | X | X | X | | | | | | | | | | | |
| 2 | X | X | X | X | | | | | | | | | | |
| 3 | X | X | | | | X | X | X | | | | | | |
| 4 | X | | | X | | | | X | | | | | | |
| 5 | X | | X | | | | | | X | X | | | | |
| 6 | X | | | X | X | | X | X | | | | | | |
| 7 | X | | | | | | | | | | X | X | | |
| 8 | X | | | X | | X | | X | | | | | | |
| 9 | X | X | | | | | | | | | | | | |
| 10 | X | | | | | X | | | | | | | | |
| 11 | | | | | | X | | | | X | | | | |
| 12 | | X | X | | | | | | | | | | X | |
| 13 | X | | | | | | | | | | | | X | |
| 14 | X | X | | | | X | | | | | | | | |
| 15 | X | | | | | | X | | | | | | X | |
| 16 | | | | X | | | | | | | | | | |
| 17 | X | X | | | | | X | | | X | | | | |
| 18 | | | | | X | X | | | | | | | | |
| 19 | | | | | | X | X | | | X | | | | X |
| 20 | X | | | | | | | | X | | | | | |
| 21 | | | | | | | | | | | | | | |

DMSO-dimethylsulfoxide
DCD-dicyandiamide
TPGME-tripropylene glycol methyl ether
CTMP-2-chloro-6-trichloromethylpyridine
NBPT-n-butyl thiophosphoric triamide
PG-propylene glycol
DPG-dipropylene glycol
DMPP-3,4 dimethylpyrazole phosphate
PC-propylene carbonate
TT-1H-1,2,4,-triazole thiol
DD-N,N-dimethyl 9-decenamide
AT-4-amino-4H-1,2,4-triazole
DMA-dimethyl acetamide Samples from Examples 1-21 were evaluated for physical properties and the results are shown in the below Table 2:

TABLE 2

| Sample # | Stability 24 hrs @ 20° C. | Chill Point ° F. | Human Health Rating | Flash Point ° F. | Aquatic Toxicity Rating |
|---|---|---|---|---|---|
| Ex 1 | Stable | <−5° | 1.0 | >145° | Low |
| Ex 2 | Stable | <−5° | 1.0 | >145° | Low |
| Ex 3 | Stable | <−5° | 1.0 | >145° | Low |
| Ex 4 | Stable | 23° F. | 1.0 | >145° | Low |
| Ex 5 | Stable | <−5° | 1.0 | >145° | Low |
| Ex 6 | Stable | 5° | 1.0 | >145° | Low |
| Ex 7 | Stable | 10° | 2 | >145° | Medium |
| Ex 8 | Stable | 5° | 1 | >145° | Low |
| Ex 9 | Stable | 25° | 1 | >145° | Low |
| Ex 10 | Stable | 32° | 1 | >145° | Low |
| Ex 11 | cloudy | 72° | 1 | >145° | Low |
| Ex 12 | Not soluble | N/A | 1 | >145° | Low |
| Ex 13 | Stable | 37.4 | 1 | >145° | Low |
| Ex 14 | Stable | <−5° | 1 | >145° | Low |
| Ex 15 | Stable | <−5 | 1 | >145° | Low |
| Ex 16 | Not soluble | N/A | 1 | >145° | Low |
| Ex 17 | Stable | <−5° | 1 | >145° | Low |
| Ex 18 | Not soluble | N/A | 1 | >145° | Low |
| Ex 19 | Stable | <−5° | 3 | <145° | Medium |
| Ex 20 | Stable | 55° | 1 | >145° | Low |
| Ex 21 | Stable | 55° | 1 | >145° | Low |

The Human Health rating is based on HMIS (Hazardous Materials Information System) rating on Health of any organo solvent component>2%

The Flash Point is based on flash point of any organo solvent component >5%

The Aquatic Toxicity Rating is based on any organo solvent component at any level It should be apparent from the above table 2 that a combination of factors will produce a solvent system that provides or gives a solution that includes at least one of the following:
a. soluble
b. environmentally safe
c. has a flashpoint above 145° F.
d. inherently rated safe for contact with humans and animals
e. results in a composition comprising at least one of nitrification and urease inhibitors with a chill point <40° F. or a chill point below 0° C.

In an embodiment, the composition results in a formulation that satisfies more than one of the above functional properties. In a variation, the formulations may have two of the above functional properties, or alternatively, three of the above functional properties, or alternatively, four of the above functional properties, or alternatively, all five of the above functional properties. Each of the functional properties may be desired (or emphasized) relative to the other functional properties based upon the intended use and transport of the compositions of the present invention. For example, one functional property may be emphasized based upon storage conditions of the formulations, or the shipping conditions of the formulations, or how the formulation is used, or based upon some other desired property. For example, if one knows that the formulation is likely to be stored at high temperatures for a long period of time, the functional property that provides the greatest stability of the formulation is likely to be used. Environmental safety may be emphasized if the formulations of the present invention are to be used where any potential run-off of the formulation is to be used near a drinking source.

In one embodiment of the present invention, compositions were made that gave favorable properties for most of the above listed functional properties. That is, the compositions of the present invention attempted to emphasize solubility, environmental safety, a low freeze chill point, a high flash point, and a composition that could be handled safely by both humans and/or animals.

The results as shown in the above table 2 demonstrate that the usage of a single aprotic solvent may in some instances show a much higher chill point product versus blends of aprotic & protic solvents. For example, comparing examples 4, 21 and 16 shows that a blend of DMSO with a protic solvent has a beneficial effect as it relates to the lower chill point and improving solubility. Other trends can be observed by comparing a) examples 9, example 1, example 12 and example 17, b) example 13 to example 15, and c) example 5 and example 20.

Example 22

To better visualize coating and penetration on the urea prills, Example 17 was dyed with powdered 'Rhodamine 6G' dye (Sigma-Aldrich). The powdered dye (20 mg) was added to 10 mL of Example 17 and mixed thoroughly. The resulting product was reddish-purple in color. It was then topically applied to granulated urea at an application rate equivalent to 3 qt/ton. The resulting product was thoroughly mixed for three minutes, providing uniform coverage to the prills. The product was then allowed to sit for 3 hours.

Eight spherical prills of relatively uniform size were selected at random from the red-dyed covered urea. The prills were split in half with a razor blade. One half of each prill was glued to a piece of paper with the split face (middle) facing up, and the prills were photographed.

The coverage on the urea prills was equally uniform as was the penetration of the prills. The average prill diameter was 3.2 mm (⅛ inch). Example 17 penetrated the prills approximately one-sixth of the diameter, or to a depth of 0.5 mm (¹⁄₄₈ inch). The penetration depth of 0.5 mm is visually demonstrated in FIG. 1. The average diameter 1 of each urea covered prill is shown in FIG. 1 as well as well as the average penetration depth 2.

Example 23

An inhibition study was conducted as described below.

Experimental Outline

A 12 week laboratory experiment was conducted in an incubation chamber set to a constant air temperature of 85° F. The experiment consisted of 4 replicate 1 quart disposal plastic tubs, each filled with 250 grams of wetted soil (a Marvyn loamy sand, which is approximately 80% sand), each of which was submitted to the appropriate treatments. Prior to placing the soil in the jar the sample was sieved through a 2 mm screen and wetted to an uniform water content (~70% of field capacity). The background soil sample indicated the following parameters: soil pH: 5.6, phosphorus: 15 lb/A, potassium: 32 lb/A, magnesium: 20 lb/A and calcium: 139 lb/A. No lime or additional fertilizers were added to this soil.

The following 5 treatments were evaluated, and there were four replications of each treatment.

| Sample | Treatment |
|---|---|
| 1 | 4 quarts of Example 17 per ton of urea |
| 2 | 6 quarts of Example 17 per ton of urea |
| 3 | 8 quarts of Example 17 per ton of urea |
| 4 | Urea only control |
| 5 | No fertilizer control |

The correct amount of Example 17 to treat one pound of urea was calculated, and that amount was sprayed on to the urea using an air brush sprayer. Example 17 was not diluted, and a uniform coating was achieved. The treated (and untreated) ureas were then mixed at an N ratio of 120 pounds N/acre. The corresponding N ratio was calculated using the area of the plastic tub.

The soil-fertilizer mix was placed into the incubator. Each week thereafter (for 12 weeks) the following occurred: 1) each bin was removed from the incubator, opened and lightly mixed before sampling, 2) a 2 g subsample of soil was removed for soil-water content determination, and, 3) a 2 g subsample of soil was removed for soil nitrate and ammonium concentration (via 2M KCl extraction). The bins were resealed and returned to the incubator until the next sampling date.

Conclusions

Application of Example 17 at 4 qt/T significantly increased soil ammonium-N at weeks 4, 5 and 6. When Example 17 was applied at 6 qt/T there was more soil ammonium-N (as compared to the urea only treatment) at weeks 3 and 6. The best inhibition of nitrification was observed when the Example 17 was applied at 8 qt/T, as soil ammonium in that treatment was greater than measured in the urea only treatment at weeks 2, 3, 4, 5, 6 and 7. This ratio gives the best inhibition of nitrification.

If nitrification is inhibited, the nitrogen content resulting from ammonium will accumulate, as the ammonium to nitrate conversion is slowed. Since nitrate-N production is slowed, the treatments to which an inhibitor should have reduced nitrate-N. This was observed when the highest rate of Example 17 was applied (8 qt/T) and the effect was significant (as compared to the urea only treatments) in weeks 4, 5, 6 and 7. When lower rates of Example 17 were applied, the effect was only significant at weeks 5 and 7.

In this one time, 8 week incubation study when Example 17 was applied to urea at 8 qt/Ton it exhibited significant nitrification inhibitory properties.

Example 24

A degradation study was performed using 2-chloro-6-trichloromethylpyridine/nBPT in DMSO and the results are shown in table 3 below.

2-chloro-6-trichloromethylpyridine/NBPT=1/1 (w/w) mixture was dissolved in DMSO. LC (liquid chromatography) analysis was done to analyze the content decrease along with time and the results are shown in table 3. All samples were sealed and protected under $N_2$. All sample were stored at 50° C.

The analysis conditions were as follows: C18 column, 255 nm. Retention time: 40 min.

Temperature: 30° C. 15 μL injection. Peak areas were calculated to analyze the concentration.

TABLE 3

| Solvent | DMSO | |
|---|---|---|
| solute | 2-chloro-6-trichloromethyl-pyridine | n-butyl-thiophosphoric triamide |
| Week # | | |
| 1 | 100 | 100 |
| 2 | 99 | 99.6 |
| 3 | 99.4 | 98 |
| 4 | 98.3 | 97.6 |
| 6 | 95.3 | 96.5 |
| 7 | 93.2 | 95.3 |
| 8 | 92.3 | 94.7 |
| 9 | 90.8 | 93 |
| 10 | 88 | 92.2 |
| 11 | 86.7 | 92.1 |
| 12 | 86.4 | 91.7 |
| 13 | 85 | 91 |
| 14 | 84.33 | 90.88 |
| 15 | 83.56 | 90.01 |
| 16 | 81.45 | 99.55 |
| 17 | 81 | 89.06 |
| 18 | 80.09 | 88.6 |

Both actives showed good stability in DMSO at 50° C. for 18 weeks.

Accordingly, in an embodiment, the present invention relates to a composition comprising one or more nitrification inhibitors in an organic liquid solvating system comprising a mixture of aprotic and protic solvents wherein a first aprotic solvent is dimethyl sulfoxide, dialkyl sulfoxide, diaryl sulfoxide, or an alkylaryl sulfoxide having the formula $$R_1\text{—}S(O)\text{—}R_2,$$ 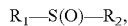

wherein $R_1$ is methyl, ethyl, n-propyl, phenyl or benzyl and $R_2$ is ethyl, n-propyl, phenyl or benzyl,
and a protic solvent is one or more of
  a) an alcohol or polyol from the family of alkylene and poly(alkylene) glycols
  b) an alkylene glycol selected from the group consisting of ethylene, propylene, and butylene glycol,
  c) glycerin,
  d) an alkylene glycol alkyl ether selected from the group comprising of dipropylene glycol methyl ether, tripropylene glycol methyl ether, and tripropylene glycol butyl ether
  e) an alkanolamine selected from the group comprising of ethanolamine, diethanolamine, dipropanolamine, methyl diethanolamine, monoisopropanolamine and triethanolamine, and/or
  f) ethyl, propyl, or butyl lactate
wherein the organic liquid solvating system meets the following criteria:
  a. environmentally safe
  b. has a flashpoint above 145° F.
  c. inherently rated safe for contact with humans and animals
  d. able to provide improved and even application to fertilizer granules of nitrification inhibitors while not causing clumping of the granules
  e. results in a composition comprising at least one of nitrification inhibitor at levels of 1-50% with a Chill Point <40° F.

In an embodiment the composition comprises a nitrification inhibitor that is one or more of the following 1) dicyandiamide, 2) 2-chloro-6 trichloromethylpyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, or 7) 3,4-dimethylpyrazole phosphate.

In one variation, the composition comprises an aprotic solvent in the mixture that is dimethyl sulfoxide. In a variation, dimethyl sulfoxide comprises between about 10 and 90% of the total composition.

In one embodiment, the nitrification inhibitor(s) is/are present in an amount that is between about 5-45% of a total formulation amount and the composition also contains a mixture of DMSO and one or more protic solvents in ratios that are between about 20/80 to 80/20.

In an embodiment, the composition further comprises: one or more of aprotic solvents present in the amount of 0.5-15%, surfactants, buffers, fragrance/odor masking agents, colorants, micro-nutrients, dispersed nitrification inhibitors, dispersed urease inhibitor(s), crystallization inhibitors and/or flow modifiers.

In an embodiment, the nitrification inhibitor(s) is/are present in an amount that is between about 5-45% of a total formulation amount and the formulation also comprises N-(n-butyl) thiophosphoric triamide in an amount that is between about 5-45% of the total formulation amount.

In one embodiment, the composition is substantially free of water.

In an embodiment, the present invention relates to a fertilizer granule or liquid additive, which comprises one or more nitrification inhibitors in an organic liquid solvating system comprising a mixture of aprotic and protic solvents: wherein a first aprotic solvent is dimethyl sulfoxide, dialkyl sulfoxide, diaryl sulfoxide, or an alkylaryl sulfoxide having the formula $$R_1\text{—}S(O)\text{—}R_2,$$ 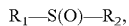

wherein $R_1$ is methyl, ethyl, n-propyl, phenyl or benzyl and $R_2$ is ethyl, n-propyl, phenyl or benzyl,
and a protic solvent is one or more of
  a) an alcohol or polyol from the family of alkylene and poly(alkylene) glycols
  b) an alkylene glycol selected from the group consisting of ethylene, propylene, and butylene glycol,
  c) glycerin,
  d) an alkylene glycol alkyl ether selected from the group comprising of dipropylene glycol methyl ether, tripropylene glycol methyl ether, and tripropylene glycol butyl ether
  e) an alkanolamine selected from the group comprising of ethanolamine, diethanolamine, dipropanolamine, methyl diethanolamine, monoisopropanolamine and triethanolamine, and/or
  f) ethyl, propyl, or butyl lactate
wherein the organo liquid solvating system meets the following criteria:
  a. Environmentally safe
  b. Have flashpoint above 145 F
  c. Inherently rated safe for contact with humans and animals
  d. able to provide improved and even application to fertilizer granules of nitrification inhibitors while not causing clumping of the granules
  e. results in a composition comprising at least one of nitrification inhibitor at levels of 1-50% with a Chill Point <40° F.

In an embodiment, the fertilizer granule or liquid additive comprises one or more nitrification inhibitors such as 1) dicyandiamide, 2) 2-chloro-6trichloromethyl)pyridine, 3) 4-amino-1,2,4-triazole-HCl, 4) 2,4-diamino-6-trichloromethyltriazine, 5) thiourea, 6) 1-mercapto-1,2,4-triazole and 2-amino-4-chloro-6-methylpyrimidine, or 7) 3,4 dimethylpyrazole phosphate.

In a variation, the fertilizer granule or liquid additive may further comprise one or more urease inhibitors such as phosphoric triamides, thiophosphoric triamides or alkylated thiophosphoric triamides, wherein the alkylated thiophosphoric triamides have one or more alkyl groups that independently contain between 1 and 6 carbon atoms.

In an embodiment, the fertilizer granule or liquid additive may contain one or more nitrification inhibitors such as 1) dicyandiamide, 2) 2-chloro-6trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-Amino-4-chloro-6-methylpyrimidine, or 7) 3,4 dimethylpyrazole phosphate; wherein the one or more urease inhibitors comprises phosphoramides.

In an embodiment, the present invention relates to making the compositions and fertilizer granules and liquid additives of the present invention. In one variation, the method relates to making a composition to be added to a fertilizer comprising:
heating a mixture comprising one or more nitrification inhibitors in an organic liquid solvating system comprising a mixture of aprotic and protic solvents
wherein a first aprotic solvent is dimethyl sulfoxide, dialkyl sulfoxide, diaryl sulfoxide, or an alkylaryl sulfoxide having the formula $R_1$—S(O)—$R_2$, wherein $R_1$ is methyl, ethyl, n-propyl, phenyl or benzyl and $R_2$ is ethyl, n-propyl, phenyl or benzyl,
and a protic solvent is one or more of
 a) an alcohol or polyol from the family of alkylene and poly(alkylene) glycols
 b) an alkylene glycol selected from the group consisting of ethylene, propylene, and butylene glycol,
 c) glycerin,
 d) an alkylene glycol alkyl ether selected from the group comprising of dipropylene glycol methyl ether, tripropylene glycol methyl ether, and tripropylene glycol butyl ether
 e) an alkanolamine selected from the group comprising of ethanolamine, diethanolamine, dipropanolamine, methyl diethanolamine, monoisopropanolamine and triethanolamine, and/or
 f) ethyl, propyl, or butyl lactate
wherein the organo liquid solvating system meets the following criteria:
 Are environmentally safe;
 Have flashpoints above 145° F.;
 Are inherently rated safe for contact with humans and animals;
 Maintain the nitrification inhibitors at levels of 1-50% in solution to storage temperatures down to at least 10° C.;
 Provides improved even application to fertilizer granules of nitrification inhibitors while not causing clumping of the granules.
 Substantially free of water
and cooling the mixture to a temperature that optionally allows an addition of one or more of aprotic solvents present in the amount of 0.5-15%, surfactants, buffers, fragrance/odor masking agents, colorants, micro-nutrients, dispersed nitrification inhibitors, dispersed urease inhibitor(s), crystallization inhibitors and/or flow modifiers.

In a variation, the method further comprises adding the composition to a fertilizer granule or liquid as an additive.

In one variation, the method makes a composition wherein the one or more nitrification inhibitors is selected from the group consisting of 1) dicyandiamide, 2) 2-chloro-6trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4 dimethylpyrazole phosphate.

In one variation, the method uses one or more urease inhibitors selected from the group consisting of phosphoric triamides, thiophosphoric triamides and alkylated thiophosphoric triamides, wherein the alkylated thiophosphoric triamides have one or more alkyl groups that independently contain between 1 and 6 carbon atoms.

In one variation, the method uses one or more nitrification inhibitors such as 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, 7) 3,4 dimethylpyrazole phosphate; and the one or more urease inhibitors comprises phosphoramides.

In one variation of the method, the method employs steps so as to make sure that the composition is substantially free of water.

The following references are incorporated by reference in their entireties.

| | | | |
|---|---|---|---|
| 4,234,332 | | | Michaud |
| 4,294,604 | | | Evrard |
| 5,024,689 | A | 6/1991 | Sutton et al. |
| 5,106,984 | | | Halpen |
| 6,488,734 | | | Barth |
| 8,562,711 | | | Sutton |

It is contemplated and therefore within the scope of the present invention that any feature that is described above can be combined with any other feature that is described above. When mixtures, formulations and/or compositions are discussed, it should be understood that those mixtures, formulations and/or compositions are contemplated as being parts of bigger mixtures, formulations and/or compositions. It is also contemplated that any feature or member of a group can be omitted from a list of possible features and/or members. Further, if a composition is enumerated, methods using and methods of making that composition are contemplated and within the scope of the present invention. When a range is discussed, it is contemplated and therefore within the scope of the invention that any number that falls within that range is contemplated as an end point generating a plurality of sub-ranges within that range. For example if a range of 1-10 is given, 2, 3, 4, 5, 6, 7, 8, and 9 are contemplated as end points to generate a sub-range that fit within the scope of the enumerated range. Moreover, it should be understood that the present invention contemplates minor modifications that can be made to the compositions and methods of the present invention. In any event, the present invention is defined by the below claims.

We claim:

1. A method to make a liquid fertilizer additive solution, wherein said liquid fertilizer additive solution comprises a solution A, wherein the solution A is comprised of a) one or more nitrification inhibitors and b) a first organic liquid, wherein said method comprises admixing said one or more nitrification inhibitors and said first organic liquid at a temperature range of about 70° C. to about 100° C. until the one or more nitrification inhibitors are completely dissolved into said first organic liquid and then cooled to less than 40° C., wherein the first organic liquid comprises one or more aprotic liquids selected from the group consisting of:
  i) dimethyl sulfoxide, and
  ii) one or more sulfoxide(s) of the structure:

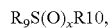

wherein
    (1) R9 and R10 are each independently a C1-C6 alkylene group, an aryl group or C1-C3 alkylenearyl group, or R9 and R10 with the sulfur to which they are attached form a 4 to 8 membered ring wherein R9 and R10 together are a C1-C6 alkylene group which optionally contains one or more atoms selected from the group consisting of O, S, Se, Te, N, and P in the ring, and
    (2) x=1,
  wherein said one or more nitrification inhibitors comprise one or more members selected from the group consisting of:
    i) dicyandiamide,
    ii) 2-chloro-6-(trichloromethyl)pyridine,
    iii) 4-amino-1,2,4-6-triazole-HCl,
    iv) 2,4-diamino-6-trichloromethyltriazine,
    v) thiourea,
    vi) 1-mercapto-1,2,4-triazole,
    vii) 2-amino-4-chloro-6-methylpyrimidine, and
    viii) 3,4-dimethylpyrazole phosphate,
  wherein said liquid fertilizer additive solution has a flash point above 145° F. and is substantially free of water, and wherein said solution A comprises a compositional weight of said one or more nitrification inhibitors of 31.5 wt % to 45 wt %.

2. The method of claim 1, wherein said liquid fertilizer additive solution further comprises one or more of: a) colorants, b) surfactants, c) buffers, d) fragrance/odor masking agents, e) micro-nutrients, f) dispersed urease inhibitors, g) crystallization inhibitors, h) flow modifiers, and i) mixtures thereof.

3. The method of claim 2, wherein said colorant is completely dissolved within said liquid fertilizer additive solution.

4. The method of claim 2, wherein said dispersed urease inhibitors are completely dissolved within said liquid fertilizer additive solution.

5. The method of claim 1, wherein said liquid fertilizer additive solution further comprises one or more urease inhibitors, wherein said one or more urease inhibitors are added to solution A at 40-50° C. or optionally added to said liquid fertilizer additive solution at less than 40° C. and wherein the one or more urease inhibitors are completely dissolved within said liquid fertilizer additive solution.

6. The method of claim 5, wherein said one or more urease inhibitors comprises one or more members selected from the group consisting of phosphoramides, alkyl thiophosphoramides, phosphoric triamides, thiophosphoric triamides and alkylated thiophosphoric triamides, wherein the alkylated thiophosphoric triamides have one or more alkyl groups that independently contain between 1 and 6 carbon atoms.

7. The method of claim 5, wherein said one or more urease inhibitors comprises N-(n-butyl) thiophosphoric triamide (NBPT).

8. The method of claim 1, wherein said liquid fertilizer additive solution further comprises a second organic liquid, wherein said second organic liquid comprises one or more protic liquids selected from of the group consisting of
  a. one or more alkylene glycols selected from the group consisting of ethylene glycol, propylene glycol, and butylene glycol,
  b. one or more poly(alkylene) glycols selected from the group consisting of poly(C1-C10 alkylene) glycols,
  c. glycerin,
  d. one or more alkylene glycol alkyl ethers selected from the group consisting of tripropylene glycol methyl ether, and tripropylene glycol butyl ether,
  e. one or more alkanolamines selected from the group consisting of ethanolamine, diethanolamine, dipropanolamine, methyl diethanolamine, monoisopropanolamine and triethanolamine, and
  f. one or more alkyl lactates selected from the group consisting of ethyl lactate, propyl lactate, and butyl lactate,
  and wherein the one or more protic liquids are added to said solution A at a temperature range of about 40° C. to about 80° C. under agitation or optionally added to said liquid fertilizer additive solution at less than 40° C.

9. The method claim 1, wherein said liquid fertilizer additive solution further comprises a third organic liquid, wherein said third organic liquid comprises aprotic liquids, wherein said third organic liquid is added to said solution A at a temperature range of about 40° C. to about 80° C. under agitation or optionally added to said liquid fertilizer additive solution at less than 40° C., and wherein third organic liquid is present in the amount of 0.5-40 wt %.

10. The method of claim 1, wherein admixing said one or more nitrification inhibitors and said first organic liquid at a temperature range of about 60° C. to about 80° C. until the one or more nitrification inhibitors are completely dissolved into said first organic liquid and then cooled to less than 40° C.

11. The method of claim 1, wherein said first organic liquid comprises dimethyl sulfoxide.

12. The method of claim 1, wherein said one or more nitrification inhibitors comprises dicyandiamide.

13. The method of claim 1, wherein said solution A comprises a compositional weight of said one or more nitrification inhibitors of 31.5 wt % to 36 wt %.

14. The method of claim 1, wherein said liquid fertilizer additive solution comprises the property of a chill point of less than 0° C.

15. The method of claim 1, wherein said liquid fertilizer additive solution comprises the property of a chill point of less than −15° C.

16. The method of claim 1, wherein said liquid fertilizer additive solution comprises the property of a chill point of less than −20° C.

17. The method of claim 1, wherein said method comprises admixing said one or more nitrification inhibitors and said first organic liquid at a temperature range of about 70° C. to about 80° C. until the one or more nitrification inhibitors are completely dissolved into said first organic liquid and then cooled to less than 40° C.

* * * * *